Oct. 19, 1954  K. ZEILER ET AL  2,691,935
CHEESE PRESS
Filed Nov. 15, 1950
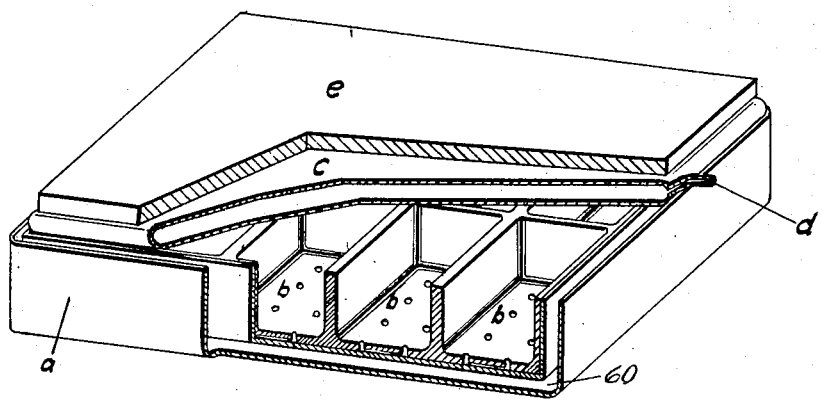
KARL ZEILER
KONRAD LENZ
INVENTORS
By Richardson, Davis and Morton
their ATTYS.

Patented Oct. 19, 1954

2,691,935

UNITED STATES PATENT OFFICE 2,691,935

CHEESE PRESS

Karl Zeiler and Konrad Lenz, Freising, Germany, assignors to Anton Steinecker Maschinenfabrik A. G., Freising, Germany, a firm Application November 15, 1950, Serial No. 195,719

Claims priority, application Germany February 22, 1950

1 Claim. (Cl. 100—93)

The invention has for its task to considerably simplify the production of Dutch cheese.

According to the invention press-pressure on the curd-cake protruding over plurality of filled molds is produced by means of a pneumatically or hydraulically inflatable body. In order to remove the whey adhering to the pressed blocks the moulds or the set consisting of a plurality of moulds in a receptacle respectively may be rotated during or after application of the press-pressure.

The sole figure illustrates, partly in perspective and partly in diagonal cross-section, partly broken, an apparatus according to the invention.

In a double-walled receptacle $a$ a plurality of moulds $b$ is placed. The walls and bottoms of the moulds may be perforated, only the bottom of the moulds being thus shown. The receptacle $a$ is provided with one or several discharge openings (not shown) for whey. Above the range of moulds $b$ there lies a penumatically or hydraulically inflatable cushion $c$ with a mouth-piece or tubular inlet $d$ for connection with the source of the pressure-agent. The lid $e$ is, by conventional means not shown in the drawings, detachably connected with the receptacle and forms the abutment for the cushion $c$.

The apparatus is operated as follows: Into the moulds $b$ which are already placed in readiness in the receptacle $a$, the curd is introduced, whilst desired quantities of whey are previously separated, and that in such a quantity that the curd protrudes over the upper rim of the moulds. The extent of the excess is such that on subsequent pressing the excess disappears in the moulds. The inflatable cushion $c$ is laid on the excess and subsequently the lid $e$ is placed on it and secured thereto by any suitable conventional means, not shown in the drawings. Now the cushion $c$ is inflated pneumatically or hydraulically; this causes the curd to be pressed into the moulds $b$ whilst simultaneously the whey is ejected and flows from the moulds $b$ into the receptacle $a$ whence it is drained. When the pressing-process is finished, the range of moulds may be brought from the horizontal position into the vertical position and rotated. Upon rotation of the device, the active surfaces of the pressing blocks, which make contact with the material to be acted upon, are subject to continual change, which thereby aids in an additional separation of the whey. Finally the set may be whirled so as to eject whey to any desired degree by centrifugal effect.

The cavity 60 of the double wall of the receptacle serves to control the temperature by means of a heated agent (gas, steam or liquid) flowing through. For the same purpose the agent inflating the body $c$ may be pre-heated.

We claim:

Combination apparatus for substantially simultaneously moulding curd and ejecting the whey therefrom, to form cheese, including a plurality of upwardly opening moulds, a double-walled receptacle containing said moulds adapted to be filled with curd over the top of the moulds, a cushion having spaced walls and inflatable with a fluid and placed atop the portion of said curd lying over the top of said moulds, an abutment against which lies said cushion and forming a stationary lid for said receptacle, and means for passing between the walls of said receptacle a fluid heating medium, whereby to raise the temperature within said receptacle, said cushion being inflatable, whereby the curd is pressed into the moulds and the whey is simultaneously ejected therefrom into the space between the walls of said receptacle.

References Cited in the file of this patent

UNITED STATES PATENTS

| Number | Name | Date |
|---|---|---|
| 505,571 | Lundstrom | Sept. 26, 1893 |
| 858,192 | Lucas | June 25, 1907 |
| 1,418,242 | Fieldman | May 30, 1922 |
| 2,103,545 | Miollis | Dec. 28, 1937 |
| 2,193,462 | Miollis | Mar. 12, 1940 |
| 2,431,943 | Land | Dec. 2, 1947 |
| 2,492,878 | Miollis | Dec. 27, 1949 |

FOREIGN PATENTS

| Number | Country | Date |
|---|---|---|
| 27,865 | Switzerland | Nov. 27, 1903 |
| 232,717 | Switzerland | Sept. 16, 1944 |
| 568,734 | Great Britain | Apr. 18, 1945 |